No. 642,523. Patented Jan. 30, 1900.
J. E. JOHNSTON.
MILK PAIL.
(Application filed Oct. 30, 1899.)
(No Model.)
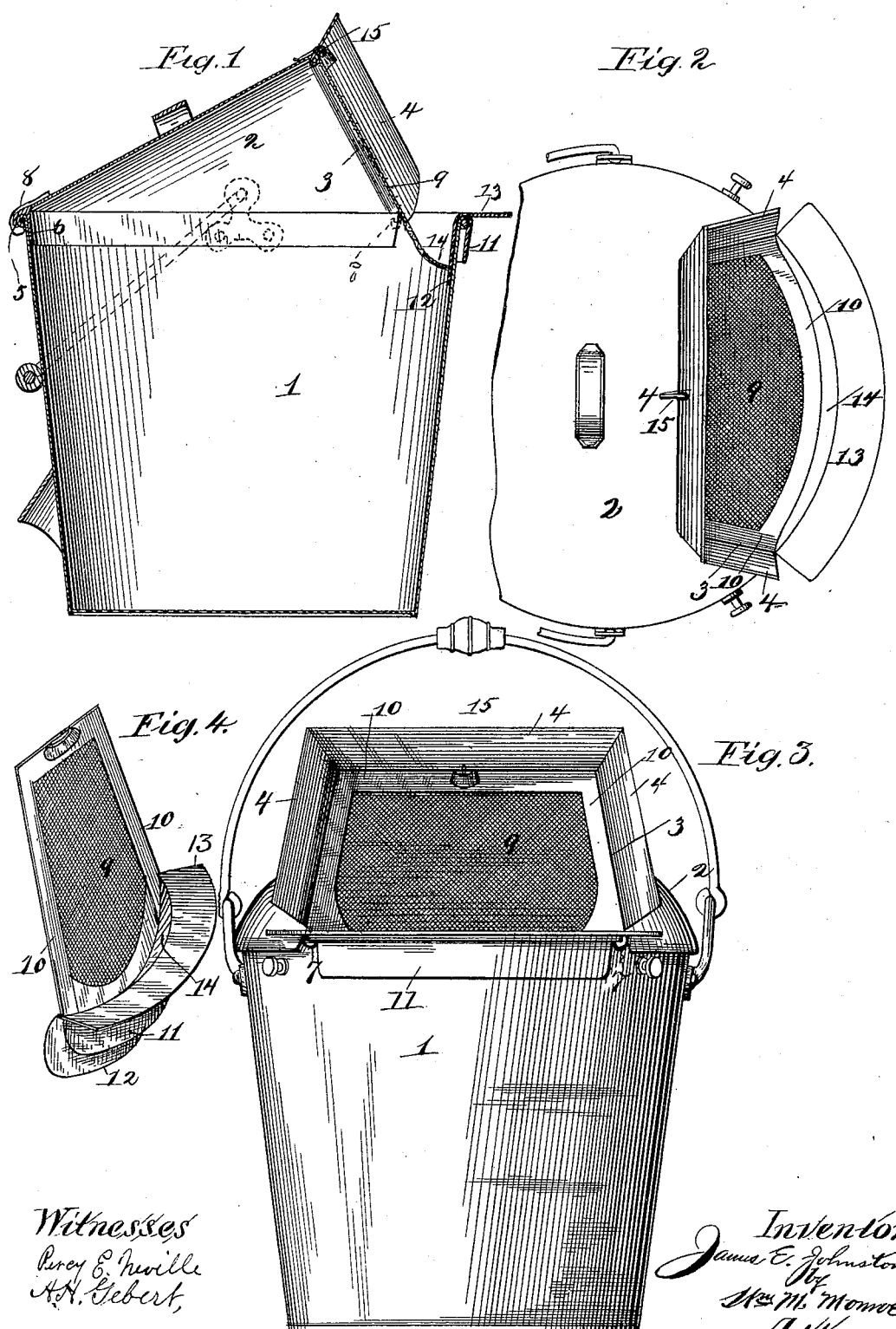

UNITED STATES PATENT OFFICE.

JAMES E. JOHNSTON, OF OBERLIN, OHIO.

MILK-PAIL.

SPECIFICATION forming part of Letters Patent No. 642,523, dated January 30, 1900.

Application filed October 30, 1899. Serial No. 735,213. (No model.)

*To all whom it may concern:*

Be it known that I, JAMES E. JOHNSTON, a citizen of the United States, and a resident of Oberlin, county of Lorain, State of Ohio, have invented certain new and useful Improvements in Milk-Pails, of which I hereby declare the following to be a full, clear, and exact description, such as will enable others skilled in the art to which it appertains to make and use the same.

My invention relates to improvements in milk-pails, and has more particular reference to that class of pails in which the milk is strained while entering the pail and all impurities from the cow or adjacent stable are effectually excluded from the pail, the milk in which is maintained in as pure a condition as in the natural state.

My invention consists in the raised cover and inclined opening and strainer and in the details of construction and arrangement of the various parts, as hereinafter described, shown in the accompanying drawings, and specifically pointed out in the claim.

In the accompanying drawings, Figure 1 is a vertical central section of the device. Fig. 2 is a plan view, Fig. 3 is a front view, and Fig. 4 is a perspective view, of the strainer-plate and attachments.

In the views, 1 is the pail. 2 is a raised cover therefor. 3 is an opening in the front of the cover, the sides of which are inclined to the edge of the pail to give free access to the milk at the angle most natural to receive the milk when directed in a stream into the pail. 4 is a flange encircling said opening on three sides to receive spattering milk and to return it to the pail. This cover 2 is provided with the inner and outer flanges 5 and 6 about its lower edge, which fit over the rim of the pail and serve to make the cover tight. Rigid catches 7 in front and a spring-catch 8 behind serve to retain the cover firmly upon the pail.

The strainer-plate for the milk is seen in the drawings to consist of a sieve of fine wire-netting 9, stretched in a metal frame 10 and placed in the inclined opening in such a manner as to rest firmly upon the sides thereof. It is also provided with the flanges 11 and 12, which extend downward upon either side of the rim of the pail. In addition it is provided with a flange 13, which extends in front to prevent the milk from spattering. A narrow pocket 14 is formed in the lower edge of this strainer-plate, into which all dirt from the milk falls or is washed from the strainer-netting. As soon as any dirt collects in this pocket the strainer-plate is removed, the dirt shaken out, and the plate returned to its place in the cover. The screen-netting does not spatter the milk even when fine enough to remove all impurities. The screen, moreover, is placed at such an angle that the dirt will not lie upon it and will not be dissolved by the milk falling upon it and so driven through the screen, but will run down into the pocket, where it will stay until thrown out. Moreover, the covered top of the pail receives all dirt falling on the pail, since the opening is so nearly vertical and so protected by its flanges that dirt will not reach it. The fine netting of the strainer will also exclude stable odors and all contaminating influences from the milk. The milk is also aerated and cooled as it passes through the strainer, and no foam or particle of butter will collect on the top of the milk.

The strainer-plate is secured to the cover by means of a simple form of catch 15 at the top.

I do not claim the exact shape or size of the various parts nor the exact angle of inclination of the strainer-plate, but have found the angle of forty-five degrees to be a convenient angle for use.

Having described my invention, what I claim as new, and desire to secure by Letters Patent, is—

In a milk-pail, an elevated cover therefor provided with an inclined opening in front, flanges about three sides of the opening and flanges adapted to fit over the rim of the pail, in combination with a strainer-plate and strainer placed in said inclined opening, a pocket in the lower edge of the strainer-plate, a flange extending outwardly therefrom, and flanges extending downward on either side of the rim of the pail from the front edge of said plate, and catches for securing the cover to the pail and the strainer-plate to the cover, substantially as described.

Signed by me at Cleveland, Ohio, this 24th day of October, A. D. 1899.

JAMES E. JOHNSTON.

Witnesses:
WM. M. MONROE,
C. H. OLDS.